H. N. ATWOOD.
VEHICLE WHEEL.
APPLICATION FILED JAN. 23, 1919.

1,348,533.

Patented Aug. 3, 1920.

Inventor.
Harry N. Atwood,
by
Attorneys.

UNITED STATES PATENT OFFICE.

HARRY N. ATWOOD, OF SMITHFIELD, NORTH CAROLINA, ASSIGNOR TO THE VENEER PRODUCTS COMPANY, OF SMITHFIELD, NORTH CAROLINA.

VEHICLE-WHEEL.

1,348,533. Specification of Letters Patent. Patented Aug. 3, 1920.

Application filed January 23, 1919. Serial No. 272,655.

*To all whom it may concern:*

Be it known that I, HARRY N. ATWOOD, a citizen of the United States, residing at Smithfield, in the county of Johnston and State of North Carolina, have invented certain new and useful Improvements in Vehicle-Wheels, of which the following is a specification.

This invention relates to vehicle wheels and has as its object to provide a vehicle wheel which may be manufactured at a low cost, which will be strong and durable in its construction, and which will possess the desired degree of resiliency.

More particularly the invention has as its object to provide an improved vehicle wheel the body of which is composed substantially in its entirety of veneer laminæ and which wheel, in one form will embody a face plate of the same material which by reason of its inherent resiliency will be adapted to withstand blows or impacts with objects met with in the course of travel without liability to denting or fracture.

A further object of the invention is to provide a vehicle wheel the body of which is composed of veneer laminæ united face to face, the body being peripherally surrounded by a metallic rim completely covering the edges of the veneer laminæ so as to exclude moisture the presence of which might otherwise in time result in deterioration of the wheel body, as for example, by partial separation of the peripheral portions of the laminæ comprising the body.

A further object of the invention is to so construct the body of the wheel as to provide for the reception therein of the inflating valve and to permit of the connection with this valve of the pump tube, the valve, however, being completely housed within the body of the wheel so as to be protected.

Figure 1:
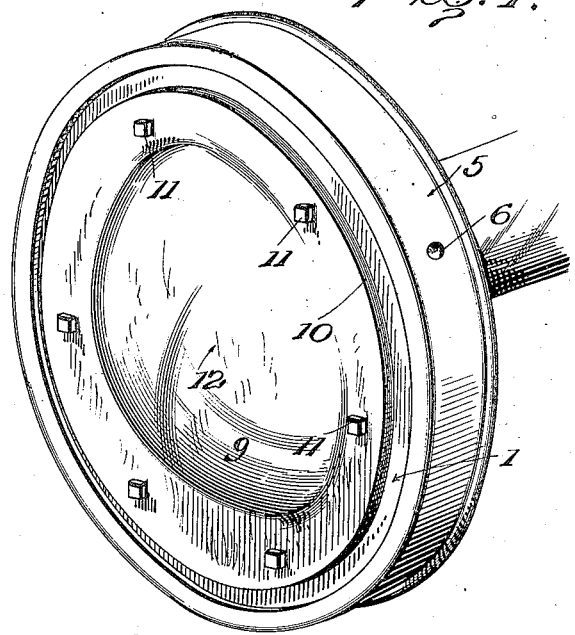
Figure 1 is a perspective view of a wheel of the military type constructed in accordance with the present invention.

In the drawings the wheel body is indicated in general by the numeral 1 and the said body is composed of laminæ 2 of wood veneer, each lamina being of circular form and the laminæ being assembled face to face with their peripheries in registration and being integrally united, when so assembled, by means of a suitable adhesive applied to their contacting faces, the entire assemblage being subjected to pressure, and if desired otherwise treated, so as to cause firm and permanent union between the laminæ. The wheel body is formed axially with a hub opening 3 and this opening may be formed either by boring through the body after the body has been completed, or each lamina may be formed with an opening, all of which openings will register when the laminæ are assembled in the manufacture of the body. In any event it is preferable that the several laminæ be arranged with the grain running alternately in opposite directions so as to effectually provide against warping and to further reinforce the body. The hub is illustrated in Figs. 2 and 3 in dotted lines and is of the usual construction and therefore need not be specifically described, the said hub being indicated in general, however, by the numeral 4.

In both forms of the invention illustrated in the drawings, the body has fitted to it a metallic rim 5 of the usual construction and designed therefore for the application thereto of the usual pneumatic tire casing. This rim is as usual preferably shrunk onto the wheel body and it will be observed by reference to the drawings that the said rim completely covers and snugly fits the peripheries of all of the laminæ comprising the body so that moisture is effectually prevented from entering between the rim and the periphery of the body where it might penetrate the peripheral portions of the laminæ and cause their partial separation and deterioration. In order to provide for the passage of the usual inflating valve (not shown) the rim 5 is formed at a point in its circumference with an opening 6, and this opening registers with an opening 7 formed in one or more of the laminæ 2, as clearly shown in Figs. 2 and 3 of the drawings. The opening 7 communicates with a recess 8 formed in the inner face of the body 1 near the periphery of the body and extending part-way through the said body and it will be understood that when the usual tire is mounted upon the rim 5, its inflating valve will extend through the openings 6 and 7 and a suitable distance into the recess 8 so that by reaching into the recess, the cap of the valve may be removed and the usual pump hose may then be inserted into the recess 8 and connected with the valve whenever it is desired to inflate the tire. It will also be evident at this point that the tire valve is completely housed within the openings 6 and 7 and recess 8 so that it cannot be broken off by coming in contact with brush or any other objects met with in the course of travel. It is also evident that the recess 8 may be made relatively small so that the body will not be appreciably weakened by reason of its presence.

Figure 3:
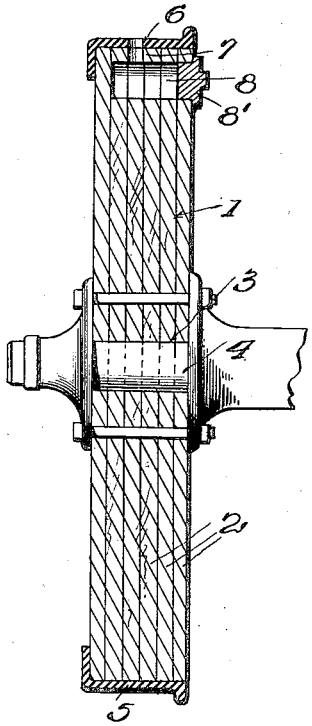
Fig. 3 is a similar view through a truck wheel constructed in accordance with the present invention.
Figure 2:
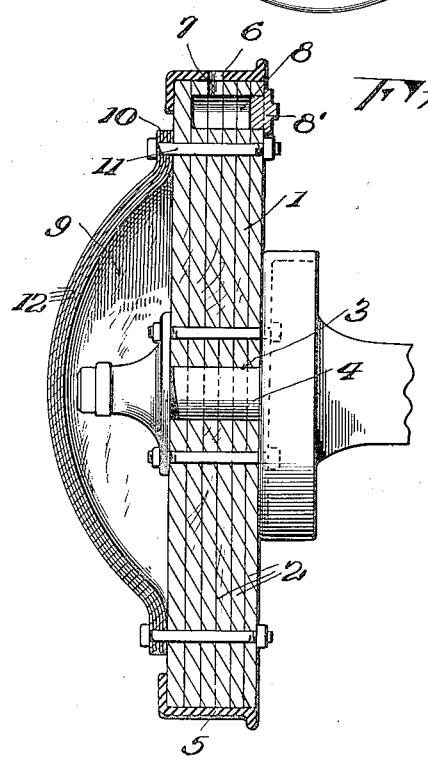
Fig. 2 is a vertical sectional view therethrough.

The construction thus far described comprehends a wheel such as shown in Fig. 3 of the drawings and which is suitable for ordinary truck use and may also be used upon the lighter types of vehicles.

Where a wheel of the military type is desired, the wheel heretofore described and illustrated in Fig. 3 is provided with a face plate as shown in Figs. 1 and 2 of the drawings. This face plate is indicated in general by the numeral 9 and the same comprises an outwardly bulged body having the general shape of a segment of a hollow sphere and provided with a peripheral flange 10 to provide for the passage of bolts 11 for securing the said plate to the outer face of the body 1 of the wheel. This face plate is, like the body of the wheel, composed of veneer laminæ indicated by the numeral 12, the laminæ being suitably united face to face and pressed or otherwise formed to the desired contour either before or after assemblage and union. As is usual in wheels of this type, the face plate 9 covers the hub cap and it will be understood that the said plate, being made of thin laminæ of veneer will possess a certain degree of resiliency by reason of which, should the wheel meet with obstructions, the said plate will yield inwardly under impact but will resume its bulged or natural form subsequent to impact. This plate is therefore not liable to become dented or fractured and is therefore by reason of its construction, particularly adapted for use in connection with the wheels of vehicles usually employing this type of wheel. It will also be understood that due to the bulged contour of the face plate, the same will thrust aside any brush or the like through which the wheel equipped therewith is passing.

It will further be understood that the wheel embodying the present invention possesses, as a whole, the desired degree of resiliency due to the fact that it is composed of thin veneer laminæ.

It is preferable that the recess 8 be closed normally by means of a cap 8' so as to prevent the entrance of mud and other foreign matter into the recess where it might accumulate and clog the same and render it inconvenient to gain access to the inflating valve.

Having thus described the invention, what is claimed as new is:

1. In a vehicle wheel, a body comprising veneer laminæ united face to face, and a face plate also comprising veneer laminæ united face to face, the said face plate being secured at its peripheral portion to the outer face of the body.

2. In a vehicle wheel, a body comprising veneer laminæ united face to face, and a face plate also comprising veneer laminæ united face to face, the said face plate being secured at its peripheral portion to the outer face of the body and having the general form of a segment of a hollow sphere.

In testimony whereof I affix my signature.

HARRY N. ATWOOD.